(12) United States Patent
Yamasuge et al.

(10) Patent No.: US 8,644,399 B2
(45) Date of Patent: Feb. 4, 2014

(54) TRANSMISSION APPARATUS, TRANSMISSION METHOD, RECEPTION APPARATUS, RECEPTION METHOD, AND TRANSMISSION SYSTEM

(75) Inventors: Hiroyuki Yamasuge, Tokyo (JP); Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 1442 days.

(21) Appl. No.: 12/305,143

(22) PCT Filed: Jun. 13, 2007

(86) PCT No.: PCT/JP2007/061907
§ 371 (c)(1),
(2), (4) Date: Dec. 16, 2008

(87) PCT Pub. No.: WO2007/148579
PCT Pub. Date: Dec. 27, 2007

(65) Prior Publication Data
US 2009/0207888 A1    Aug. 20, 2009

(30) Foreign Application Priority Data
Jun. 23, 2006 (JP) .................................. 2006-174207

(51) Int. Cl.
*H04K 1/10* (2006.01)
*H04L 27/28* (2006.01)

(52) U.S. Cl.
USPC ........... 375/260; 370/464; 370/480; 370/482; 455/59

(58) Field of Classification Search
None
See application file for complete search history.

(56) References Cited

U.S. PATENT DOCUMENTS

| | | | |
|---|---|---|---|
| 6,175,551 B1* | 1/2001 | Awater et al. | 370/210 |
| 7,869,529 B2* | 1/2011 | Rajagopal et al. | 375/260 |
| 2005/0152466 A1* | 7/2005 | Maltsev et al. | 375/260 |

(Continued)

FOREIGN PATENT DOCUMENTS

| | | |
|---|---|---|
| JP | 2818156 | 8/1998 |
| JP | 818156 | 10/1998 |

(Continued)

OTHER PUBLICATIONS

Notification of First Office Action with English language translation issued by the State Intellectual Property Office of P.R. China on Jul. 4, 2011 in corresponding Chinese application No. 200780023633.2.

*Primary Examiner* — Shuwang Liu
*Assistant Examiner* — Gina McKie
(74) *Attorney, Agent, or Firm* — Finnegan, Henderson, Farabow, Garrett & Dunner, LLP

(57) ABSTRACT

It is desired to suitably carry out transmission processing and reception processing carried out when transmitting a multi-carrier signal where specific subcarriers are omitted. Therefore, the present invention carries out transmission avoidance processing operable when transmitting a multicarrier signal to replace signals corresponding to subcarriers, in a plurality of subcarriers, at frequency positions where transmission is avoided with a null signal. Subsequently, an inverse Fourier transform is carried out on the output of the transmission avoidance processing, the transmission power of the multi-carrier signal that has been transformed is amplified in accordance with the number of subcarriers replaced with the null signal and the multicarrier signal is transmitted. When this multicarrier signal is received, subcarriers where transmission was avoided are estimated, and when it is estimated in the estimation that subcarriers where transmission was avoided are present, despreading and demodulation are carried out without using the subcarriers where transmission was avoided.

3 Claims, 18 Drawing Sheets

(56) References Cited

U.S. PATENT DOCUMENTS

| | | |
|---|---|---|
| 2005/0190822 A1* | 9/2005 | Fujii et al. ............... 375/211 |
| 2005/0195758 A1* | 9/2005 | Chitrapu ................. 370/279 |
| 2005/0265226 A1* | 12/2005 | Shen et al. .............. 370/210 |
| 2006/0018251 A1* | 1/2006 | Park et al. ............... 370/209 |
| 2006/0109925 A1* | 5/2006 | Kannan et al. ........... 375/260 |
| 2006/0128310 A1* | 6/2006 | Leabman ................. 455/63.1 |
| 2006/0128323 A1* | 6/2006 | Fujimoto ................. 455/101 |
| 2006/0160498 A1* | 7/2006 | Sudo ....................... 455/103 |
| 2006/0203845 A1* | 9/2006 | Monogioudis ........... 370/466 |
| 2008/0056395 A1* | 3/2008 | Brink et al. .............. 375/260 |
| 2010/0165956 A1* | 7/2010 | Razzell .................... 370/338 |
| 2010/0184391 A1* | 7/2010 | Razzell .................... 455/114.2 |

FOREIGN PATENT DOCUMENTS

| | | |
|---|---|---|
| JP | 11-215094 | 8/1999 |
| JP | 11-317723 | 11/1999 |
| JP | 2000-358008 | 12/2000 |
| JP | 2003-032218 | 1/2003 |
| JP | 2005-027259 | 1/2005 |
| JP | 2005-27259 | 1/2005 |
| JP | 2005-045504 | 2/2005 |
| JP | 2005-101787 | 4/2005 |
| JP | 2005-175754 | 6/2005 |
| JP | 2008-197375 | 7/2006 |
| WO | WO 2004034620 A1 * | 4/2004 |

* cited by examiner

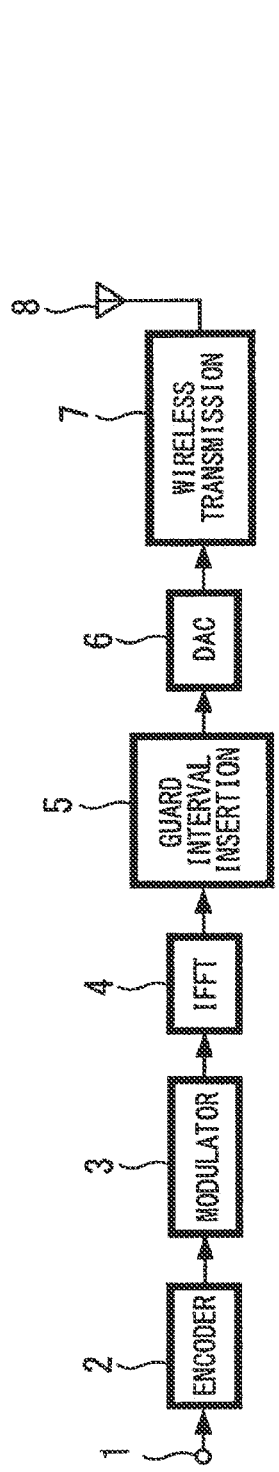
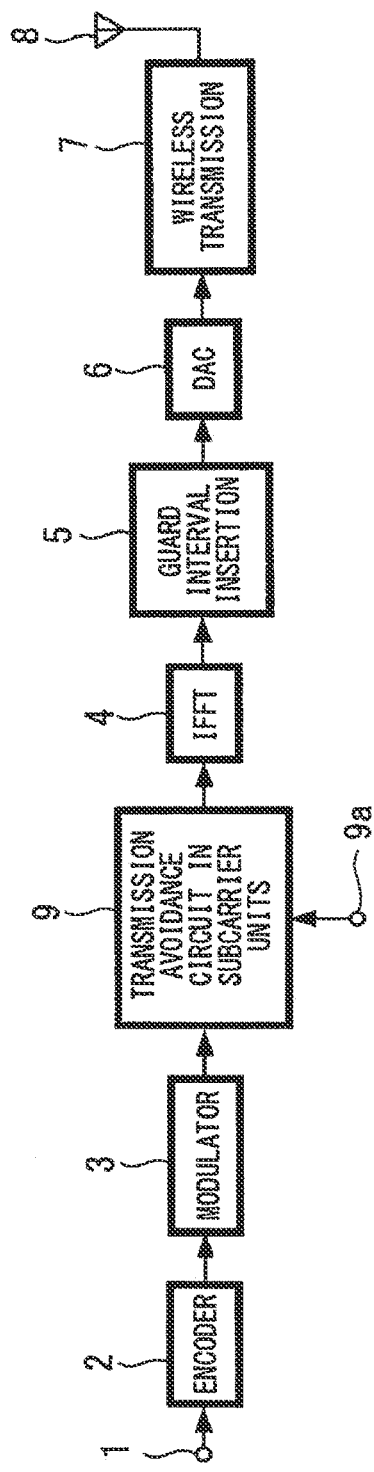
PRIOR ART

FIG. 7
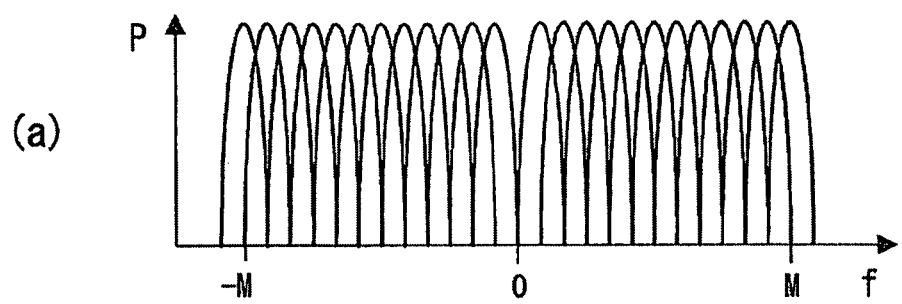
(a)
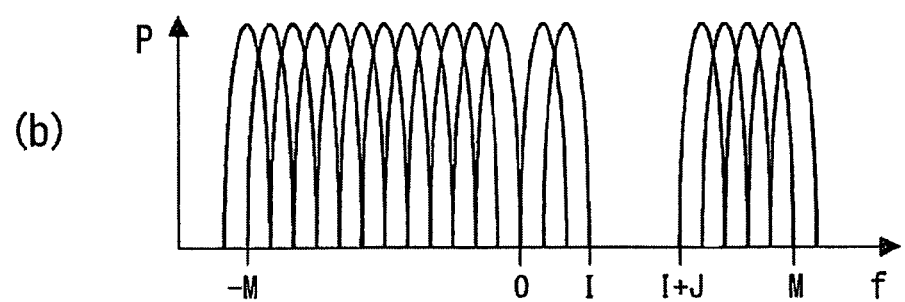
(b)

TRANSMISSION APPARATUS, TRANSMISSION METHOD, RECEPTION APPARATUS, RECEPTION METHOD, AND TRANSMISSION SYSTEM

TECHNICAL FIELD

The present invention relates to a transmission apparatus and transmission method that transmit a multicarrier signal, a reception apparatus and reception method that receive such multicarrier signal, and a transmission system that transmits a multicarrier signal.

BACKGROUND ART

A communication technique called OFDM (Orthogonal Frequency Division Multiplexing) is used in wireless transmission and the like. Such technique is a digital modulation technique where a plurality of subcarriers are aligned at predetermined frequency intervals and information is transmitted on the respective subcarriers. Using this technique, it is possible to closely space a plurality of carrier waves without interference between the respective waves and thereby achieve broadband transmission that efficiently uses a narrow range of frequencies. This makes it possible to improve the usage efficiency of frequencies and is suitable for achieving high-speed data transmission.

For example, IEEE (Institute of Electrical and Electronic Engineers) 802.11a that is a standard for wireless LAN (Local Area Networks) carries out wireless transmission using an OFDM technique. Also, according to UWB (Ultra Wide Band) technology, practical use of which has been considered in recent years, a comparatively wide band of high frequencies in a GHz band or the like is used to transmit a multicarrier signal.

FIG. 1 is a diagram showing an example configuration of an existing transmission apparatus that transmits a multicarrier signal. According to the configuration shown in FIG. 1, transmission data obtained at an input terminal 1 is encoded by an encoder 2 and the encoded transmission data is modulated for wireless transmission by a modulator 3. In the transmission data, modulated by the modulator 3, transmission symbols are subjected to an inverse Fourier transform by an Inverse Fast Fourier Transform (IFFT) circuit 4. The transmission symbols subjected to the inverse Fourier transform are sent to a guard interval inserting unit 5, guard intervals are inserted at constant intervals, and the output with the inserted guard intervals is supplied to a digital/analog converter 6 and converted to an analog signal. The converted analog signal is supplied to a wireless transmission unit 7 and is wirelessly transmitted on a predetermined transmission frequency from a connected antenna 8.

However, since the OFDM communication technique uses a carrier with a comparatively wide bandwidth, there is a risk of interference with another carrier being used on another communication network. For example, such a case that a mobile phone unit carries out communication using a predetermined frequency included within the frequency band of the multicarrier signal may be one of the above-described cases. When this type of interference occurs, there are risks that communication quality deteriorates and the communication may be impossible. Therefore, it is necessary to take measures to avoid such interference. One example of a measure that has been investigated in recent years is a technique called DAA (Detect And Avoid). When a multicarrier signal is transmitted, DAA stops transmission on a specific frequency band (for example, in subcarrier units) in the comparatively wide frequency band used for wireless transmission.

FIG. 2 is a diagram showing an example configuration of a transmitter capable of applying the DAA technique. In the example in FIG. 2, the output of the modulator 3 is supplied in subcarrier units to a transmission avoidance circuit 9, information on locations (positions) of subcarriers on which transmission is avoided is obtained from a terminal 9a, and transmission data assigned to the subcarriers designated by such information is replaced with a null signal. A series of transmission symbols partially replaced with the null signal is supplied to the IFFT circuit 4 where processing to orthogonally convert the series to a multicarrier signal is carried out. The remaining processing configuration is the same as the transmission apparatus in FIG. 1. As shown in FIG. 2, by obtaining a multicarrier signal in which the subcarriers with the frequency positions, where transmission is avoided, have been omitted, it is possible to wirelessly transmit a multicarrier signal where transmission is avoided on frequency bands where transmission is to be stopped.

Japanese Unexamined Patent Application Publication No. 2005-27259 issued by the Japanese Patent Office discloses an example of wireless transmission processing for a multicarrier signal.

However, as shown in the example configuration in FIG. 2, when a simplified configuration is used where transmission symbols are removed before carrying out an inverse Fourier transform by the IFFT circuit, a transmission level of the frequency positions (that is, the subcarriers) where transmission is to be stopped will not be sufficiently reduced and it will not be possible to sufficiently prevent interference. For example, in a transmitter configured as shown in FIG. 2, when some of the transmission symbols have been replaced with a null signal, the signal level of the subcarriers assigned the null signal will only be around 15 dB lower than the other subcarriers, and therefore it will not be possible to sufficiently suppress interference from occurring.

As another example of processing that omits specific subcarriers from a multicarrier signal, it would be possible to omit subcarriers by supplying a signal subjected to an inverse Fourier transform by the IFFT circuit to an FIR (Finite Impulse Response) filter and carrying out filtering processing using the FIR filter to omit the subcarriers. However, if an FIR filter is provided, there is a corresponding increase in the circuit scale of the transmission system. In addition, a technology called AIC (Active Interference Cancellation) has been proposed, but in the case where such technology is applied, a complex circuit configuration may be required.

In addition, to properly receive a multicarrier signal where specific subcarriers have been omitted, it is essential that a receiver side accurately figures out that the specific subcarriers were omitted from the signal received. However, with methods proposed in the past, sufficient measures have not been implemented to achieve this and the receiver side has not been able to adequately cope therewith.

The present invention is conceived in view of the above and aims to suitably carry out transmission processing and reception processing when transmitting a multicarrier signal where specific subcarriers are excluded.

DISCLOSURE OF THE INVENTION

A first aspect of the invention carries out transmission avoidance processing operable in the case of transmitting a multicarrier signal where a plurality of subcarriers are disposed at predetermined frequency intervals, to replace signals corresponding to subcarriers, in the plurality of subcarriers, at frequency positions where transmission is avoided with a null signal. Processing including an inverse Fourier transform is carried out on the output of the transmission avoidance processing so as to obtain a multicarrier signal to be transmitted with the transmission power amplified in accordance with the number of subcarriers replaced with the null signal.

According to the first aspect of the invention, an effect of sufficiently lowering the level of non-transmitted subcarriers can be obtained using a simplified circuit configuration. It is also possible to avoid a reduction in the power of the transmission signal due to the signal power of some of the subcarriers being reduced, which makes it possible to avoid deterioration in the reception characteristics.

A second aspect of the present invention is operable in the case of receiving a multicarrier signal where a plurality of subcarriers are disposed at predetermined frequency intervals, to carry out a fast Fourier transform on a reception signal and to estimate subcarriers, where transmission was avoided, in the transformed reception multicarrier signal. When subcarriers estimated in the estimation that transmission was avoided are present, despreading and demodulation are carried out without using the subcarriers where transmission was avoided.

According to the second aspect of the invention, subcarriers including only noise are not used in the subsequent demodulation processing, and therefore it is possible to improve deterioration in the characteristics even when a signal where specific subcarriers are omitted has been received.

BRIEF DESCRIPTION OF THE DRAWINGS

FIG. 1 is a diagram showing an example configuration of an existing transmission apparatus.

FIG. 2 is a diagram showing an example configuration of an existing transmission apparatus.

FIG. 7 is a waveform diagram: showing an example of transmission power according to the first embodiment of the present invention.

BEST MODE FOR CARRYING OUT THE INVENTION

Hereinafter, a first embodiment of the present invention will be described with reference to FIGS. 3 to 7.

The present embodiment uses a configuration that wirelessly transmits a multicarrier signal that is a signal where, a plurality of subcarriers are disposed at constant frequency intervals. Here, transmission can be stopped as necessary for subcarriers at specific frequency positions in the transmitted frequency band. The frequency positions at which transmission is stopped may be decided in advance, or the wireless state in the periphery may be monitored and frequency positions where there is the risk of causing or receiving interference may be set as necessary.

Figure 3:
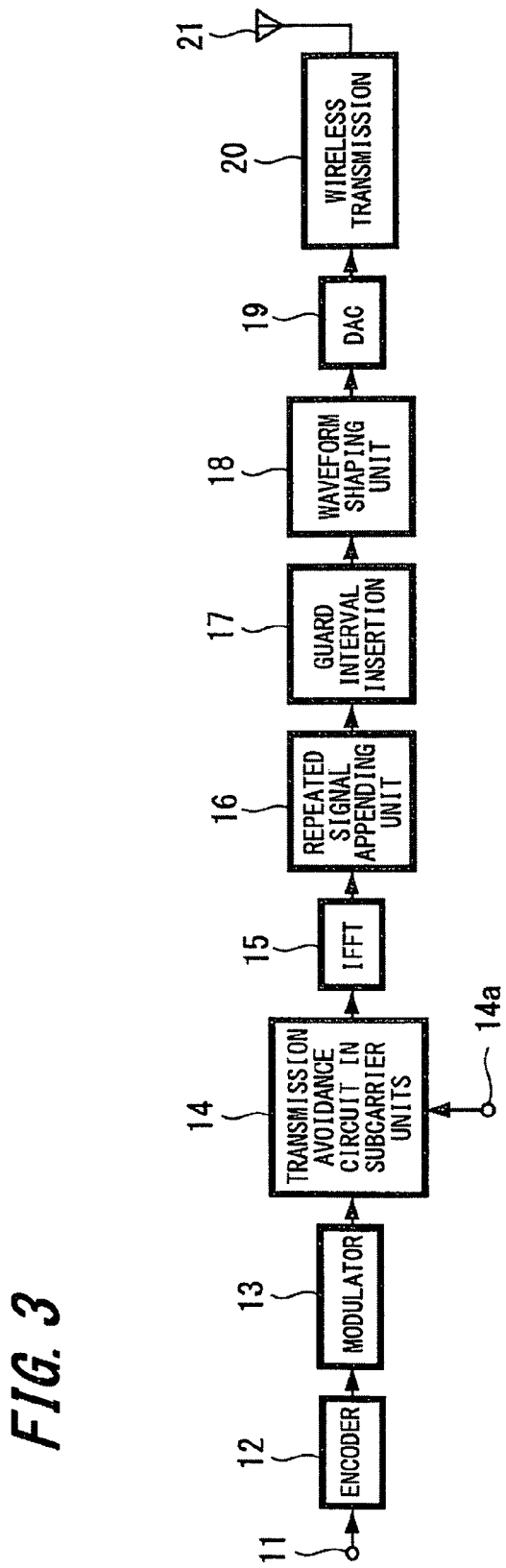
FIG. 3 is a diagram showing an example configuration of a transmission apparatus according to a first embodiment of the present invention.

FIG. 3 shows an example configuration of a transmission apparatus according to the present embodiment. As shown in FIG. 3, transmission data obtained at an input terminal 11 is encoded by an encoder 12 and the encoded transmission data is modulated for wireless transmission by a modulator 13. The transmission data (i.e., transmission symbols) modulated by the modulator 13 are supplied to a transmission avoidance circuit 14 in subcarrier units, information on the locations (positions) of subcarriers where transmission is avoided is obtained from a terminal 14a, and data at the subcarrier positions designated by such information is replaced with a null signal. A series of transmission symbols where some of the symbols have been replaced with the null signal is supplied to an IFFT circuit 15 where processing of orthogonally transforming the frequency axis to the time axis to obtain a multicarrier signal is carried out. Note that data on one subcarrier may be replaced with the null signal as the processing of replacing data with the null signal carried out by the transmission avoidance circuit 14 in subcarrier units, or the data on a plurality of adjacent subcarriers, for example, may be replaced with the null signal.

The transmission symbols after the transform by the IFFT circuit 15 are supplied to a repeated signal appending unit 16 to append repeated signals to the signal. Subsequently, the transmission symbols appended with the repeated signals are sent to a guard interval inserting unit 17 where guard intervals are inserted at constant intervals and an output into which guard intervals have been inserted is supplied to a waveform shaping unit 18 where waveform shaping processing is carried out. The signal subjected to waveform shaping by the waveform shaping unit 18 is supplied to a digital/analog converter 19 to convert the signal to an analog signal. The resulting analog signal is supplied to a wireless transmitter unit 20 and is wirelessly transmitted on a predetermined transmission frequency from a connected antenna 21.

Figure 4:
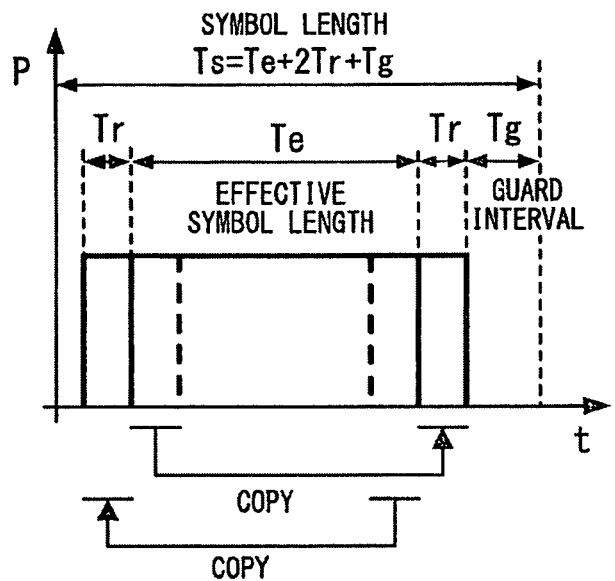
FIG. 4 is a diagram showing an example where signals are appended before and after a symbol according to the first embodiment of the present invention.

Next, the processing by the respective circuits shown in FIG. 3 will be described. First, the processing by the repeated signal appending unit 16 that appends the repeated signals will be described with reference to FIG. 4. In FIG. 4, the horizontal axis represents the time t and the vertical axis represents the power P. Here, as shown in FIG. 4, when the length of one transmission symbol is set as Ts, repeated signals Tr are provided where copies of the symbols in predetermined sections at the front end and rear end of an effective symbol Te inside one symbol are appended at the opposite end of the effective symbol. Although an example where copies Tr are appended at both the front end and rear end of the effective symbol Te is shown in FIG. 4, a copy may instead be appended at only one end. A guard interval Tg appended by the guard interval inserting unit 17 is also shown in the example in FIG. 4, showing one transmission symbol Ts=Te+2Tr+Tg. The guard interval Tg is appended by the guard interval inserting unit 17 by carrying out appending processing that inserts a null signal, for example.

Figure 5:
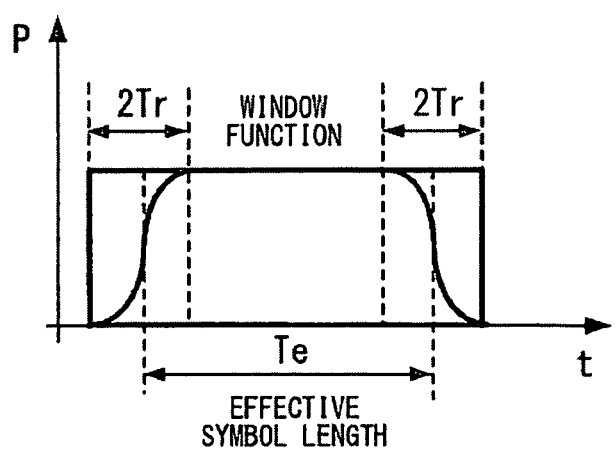
FIG. 5 is a diagram showing an example of waveform shaping using a window function according to the first embodiment of the present invention.

Data of one transmission symbol generated as described above is supplied to the waveform shaping unit 18 where waveform shaping processing is carried out. As an example of the waveform shaping processing, window multiplying processing that multiplies a window function may be carried out. FIG. 5 shows an example of waveform shaping processing carried out by window multiplying processing. In FIG. 5, the horizontal axis represents the time t and the vertical axis represents the power P. In the window multiplying processing, a window function is set corresponding to the length of the effective symbol Te, where a signal level rises and falls smoothly at the front end and the rear end of the effective symbol Te. Each range 2Tr where the signal level rises and falls is set at double the length of the copy sections Tr described above. By setting the value of the window function in this way, the total of the values of the window function displaced by the length of the effective symbol will always be a constant value. By setting the window function in this way, the energy of the transmission symbol will not become larger than the energy of the part with the length of the effective symbol before multiplication by the window function.

By carrying out the waveform shaping processing that uses the window function shown in FIG. 5 after appending copies to the opposite end out of the front end and the rear end of the effective symbol Te in one symbol as shown in FIG. 4, it is possible to greatly reduce the sidelobe level that is extension to the side of the signal of one transmission symbol. In the case where transmission is stopped by replacing data on a subcarrier at a specific frequency position with the null signal, the signal level (i.e., transmission power) of the position where transmission has been stopped will also fall in the same way as the fall in the level of the side lobes. Accordingly, at the receiver side of such transmission signal, even in the case where the transmission of one or more subcarriers within one transmission symbol has been stopped, it will still be possible to suitably demodulate only the data sent by the transmitted subcarriers without being affected by the influence of the subcarriers whose transmission has been stopped.

Figure 6:
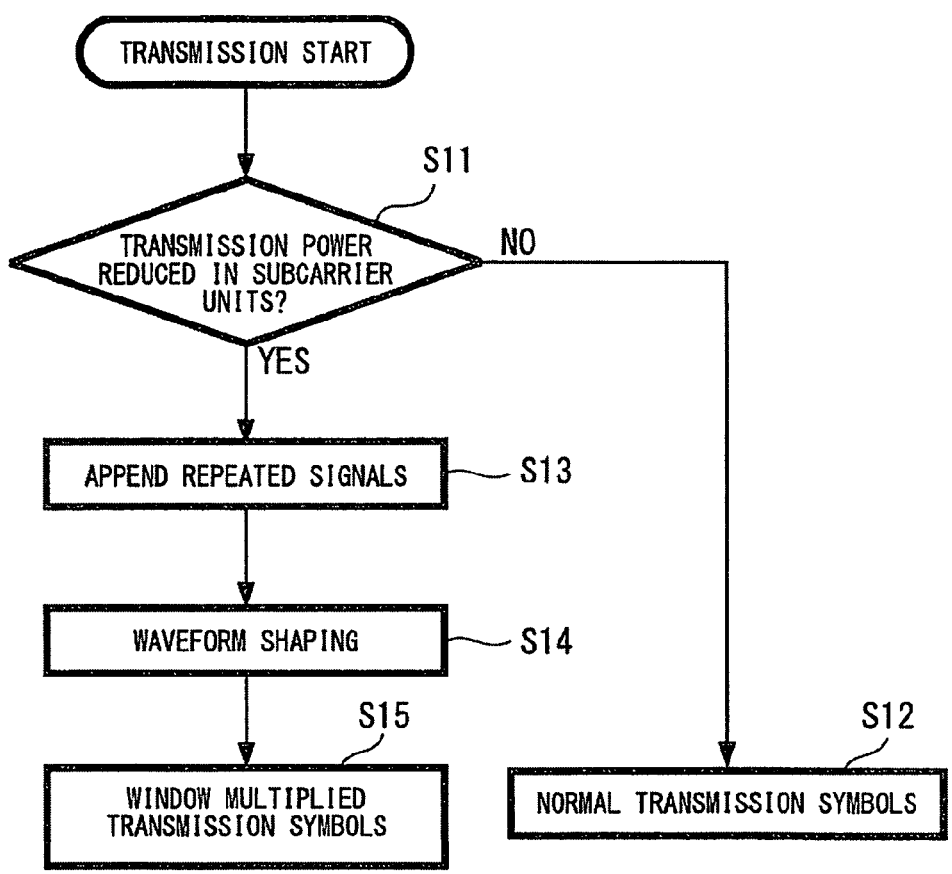
FIG. 6 is a flowchart showing an example of processing of switching a transmission symbol according to the first embodiment of the present invention.

Next, an example of changing the transmission processing carried out with the transmission configuration shown in FIG. 3 based on whether the transmission avoidance processing is carried out in subcarrier units will be described with reference to the flowchart in FIG. 6. The processing in FIG. 6 is carried out by a control unit (not shown) that controls the processing by the transmission configuration shown in FIG. 3, and the supplying of information on subcarrier positions where transmission is avoided to the terminal 14*a* in FIG. 3 is also carried out by the control unit. First, it is determined whether the transmission avoidance processing in subcarrier units (that is, "transmission power reducing processing" in subcarrier units) is carried out (step S11). Here, in the case where the transmission avoidance processing in subcarrier units is not carried out, processing that generates transmission symbols for a normal multicarrier signal is carried out and the generated transmission symbols are wirelessly transmitted (step 512). Here, the expression "normal transmission symbols" refers to transmission symbols for which the processing of appending repeated signals by the repeated signal appending unit 16 and the multiplication processing where the waveform shaping unit 18 multiplies by the window function are not carried out.

On the other hand, when it is determined in step S11 that the transmission avoidance processing in subcarrier, units is carried out, the appending of repeated signals is carried out by the repeated signal appending unit 16 as shown in FIG. 4 (step 513) and the multiplication processing where the waveform shaping unit 18 multiplies by the window function is carried out (step S14) to obtain transmission symbols multiplied by the window function. Such transmission symbols are then wirelessly transmitted (step S15).

Note that as shown in the flowchart in FIG. 6, even though the processing of appending repeated signals by the repeated signal appending unit 16 and the multiplication processing where the waveform shaping unit 18 multiplies by the window function are changed based on whether the transmission avoidance processing is carried out in subcarrier units, the processing units may always carry out the same processing regardless of whether the transmission avoidance processing is carried out in subcarrier units.

In the case where the transmission avoidance processing carried out in subcarrier units and the processing of appending the repeated signals and multiplication processing that multiplies by the window function that accompany the avoidance processing are commenced, data indicating such processing may be appended to the transmission data and transmitted. On the receiver side, when receiving such data, the receiver can recognize that data for which the processing of appending the repeated signals and the multiplication processing that multiplies by the window function have been carried out has started to be received and can commence corresponding reception processing. The configuration of such reception processing will be described later.

FIG. 7 is a diagram showing an example of subcarriers wirelessly transmitted when transmission processing is carried out with the above-described configuration. In FIG. 7, the horizontal axis represents the frequency f and the vertical axis represents the power P. FIG. 7(a) is an example where the transmission avoidance processing is not carried out in subcarrier units. The horizontal axis represents the frequency and a large number of subcarriers of a constant power are disposed at constant intervals in a frequency range of +M to −M about a center frequency O. FIG. 7(b) is an example where transmission is avoided on subcarriers from the frequency positions I to J, with the transmission power being reduced in the corresponding section.

Next, a second embodiment of the present invention will be described with reference to FIGS. 8 to 11. In FIGS. 8 to 11, parts that correspond to those in FIGS. 3 to 7 described above in the first embodiment are assigned the same reference numerals.

The present embodiment also uses a configuration that wirelessly transmits a multicarrier signal where a plurality of subcarriers are disposed at constant frequency intervals. With respect to subcarriers at specific frequency positions in the transmitted frequency band, transmission may be stopped as necessary. Here, the frequency positions at which transmission will be stopped may be decided in advance, or the wireless state in the periphery may be monitored and frequency positions where there is the risk of causing or receiving interference may be set as necessary.

Figure 8:
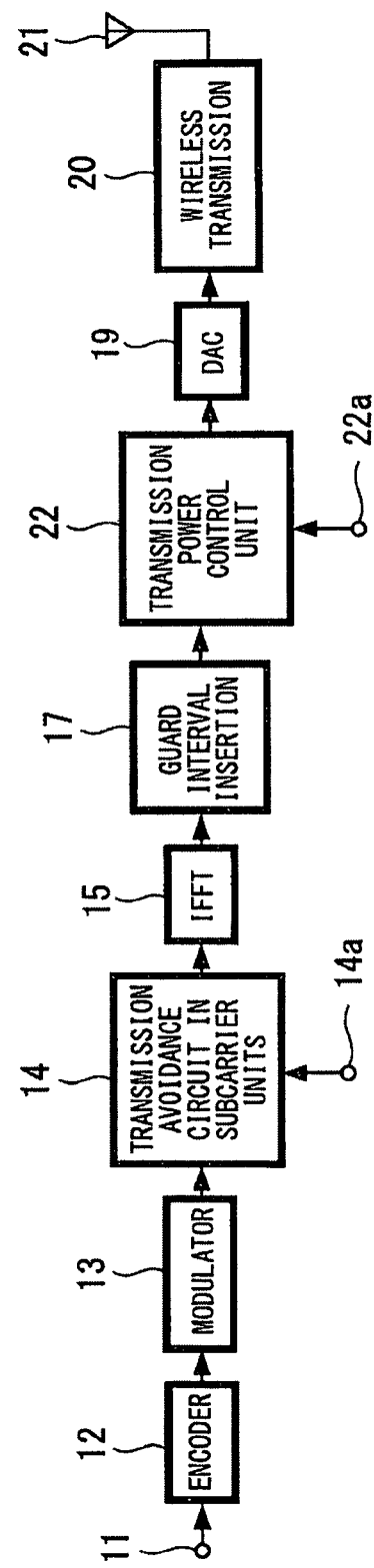
FIG. 8 is a diagram showing an example configuration of a transmission apparatus according to a second embodiment of the present invention.

FIG. 8 shows an example configuration of a transmission apparatus according to the present embodiment. As shown in FIG. 8, transmission data obtained at the input terminal 11 is encoded by the encoder 12 and the encoded transmission data is modulated for wireless transmission by the modulator 13. The transmission data (i.e., transmission symbols) modulated by the modulator 13 is supplied to the transmission avoidance circuit 14 in subcarrier units, information on the locations (positions) of subcarriers where transmission is avoided is obtained from the terminal 14a, and data at the subcarrier positions designated by such information is replaced with a null signal. A series of transmission symbols where some of the symbols have been replaced with the null signal is supplied to the IFFT circuit 15 where orthogonal transform processing is carried out to obtain a multicarrier signal.

The transmission symbols after the transform by the IFFT circuit 15 are supplied to the repeated signal appending unit 16 to append repeated signals to the symbols. Subsequently, the transmission symbols appended with the repeated signals are sent to the guard interval inserting unit 17 where guard intervals are inserted at constant intervals. The configuration up to the insertion of the guard intervals by the guard interval inserting unit 17 is the same as in FIG. 3.

Further, in the present embodiment, the output into which guard intervals have been inserted by the guard interval inserting unit 17 is supplied to a transmission power control unit 22. In the transmission power control unit 22, information on the number of subcarriers where transmission has been avoided is obtained from a terminal 22a, and amplification processing that amplifies the transmission power in accordance with the number of subcarriers designated by such information is carried out. The amplification processing that amplifies the transmission power will be described later in detail.

The series of transmission symbols outputted by the transmission power control unit 22 is supplied to the digital/analog converter 19 and converted to an analog signal. The resulting analog signal is supplied to the wireless transmitter unit 20 and is wirelessly transmitted from the connected antenna 21 on a predetermined transmission frequency.

Figure 9:
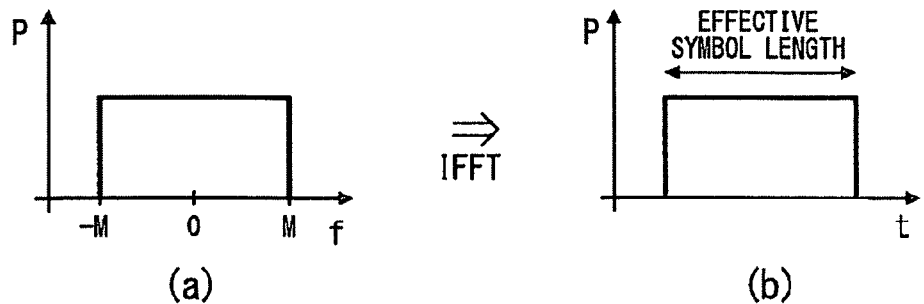
FIG. 9 is a diagram showing an example of transmission power according to the second embodiment of the present invention.
Figure 10:
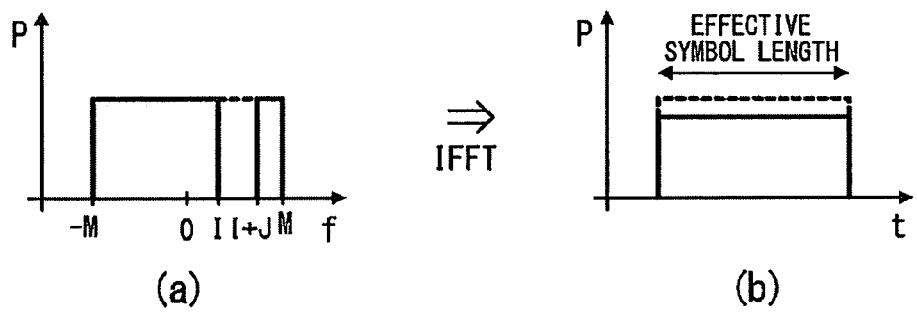
FIG. 10 is a diagram showing an example of transmission power according, to the second embodiment of the present invention.
Figure 11:
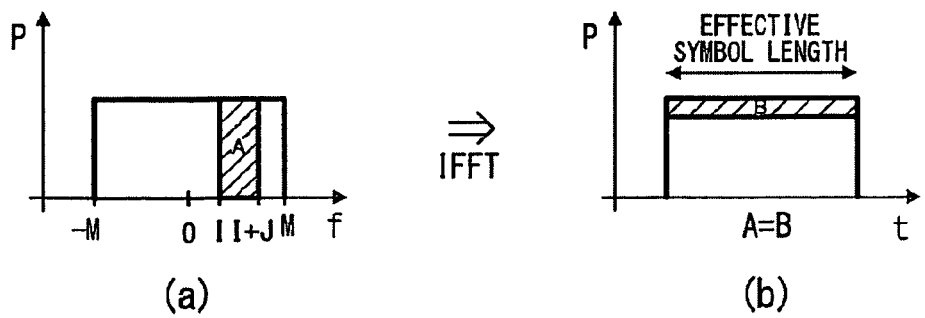
FIG. 11 is a diagram showing an example of transmission power according to the second embodiment of the present invention.

FIGS. 9 to 11 show an example of the amplification processing carried out by the transmission power control unit 22 that amplifies the transmission power. In FIGS. 9 to 11, the horizontal axis represents the frequency f or the time t, and the vertical axis represents the power P. First, an example of processing when transmission on a subcarrier is not avoided is shown in FIG. 9. In this case, the signal before the orthogonal transform by the IFFT circuit 15 (see FIG. 9(a)) has a constant power from the frequency −M to +M. As shown in FIG. 9(b), the signal obtained through the orthogonal transform, is a signal where the transmission power of each subcarrier in one effective symbol is constant.

Next, in the case where transmission is avoided for I+J starting from a specific frequency position I as shown in FIG. 10(a), if the signal were transmitted as it is, as shown in FIG. 10(b) there would be a fall in power equal to the missing subcarriers (i.e., a fall from the power level shown by the broken line). FIG. 11 shows a state where, in the present embodiment, processing is carried out by the transmission power control unit 22 to increase the transmission power in accordance with the number of omitted subcarriers. That is, as shown in FIG. 11(a) for example, when the transmission of subcarriers is avoided for I+J starting from a specific frequency position I, the power A is missed. Here, by amplifying the power corresponding to the number of missing subcarriers, as shown in FIG. 11(b), the transmission power is increased with power B, thereby obtaining the same power as when a multicarrier signal is transmitted without omitting any subcarriers. Here, the missing power A and the increased power B are set to be substantially equal.

By controlling the transmission power in accordance with missing subcarriers as described above, even if transmission of some subcarriers is avoided, it will still be possible to carry out suitable wireless transmission with a constant power.

Figure 12:
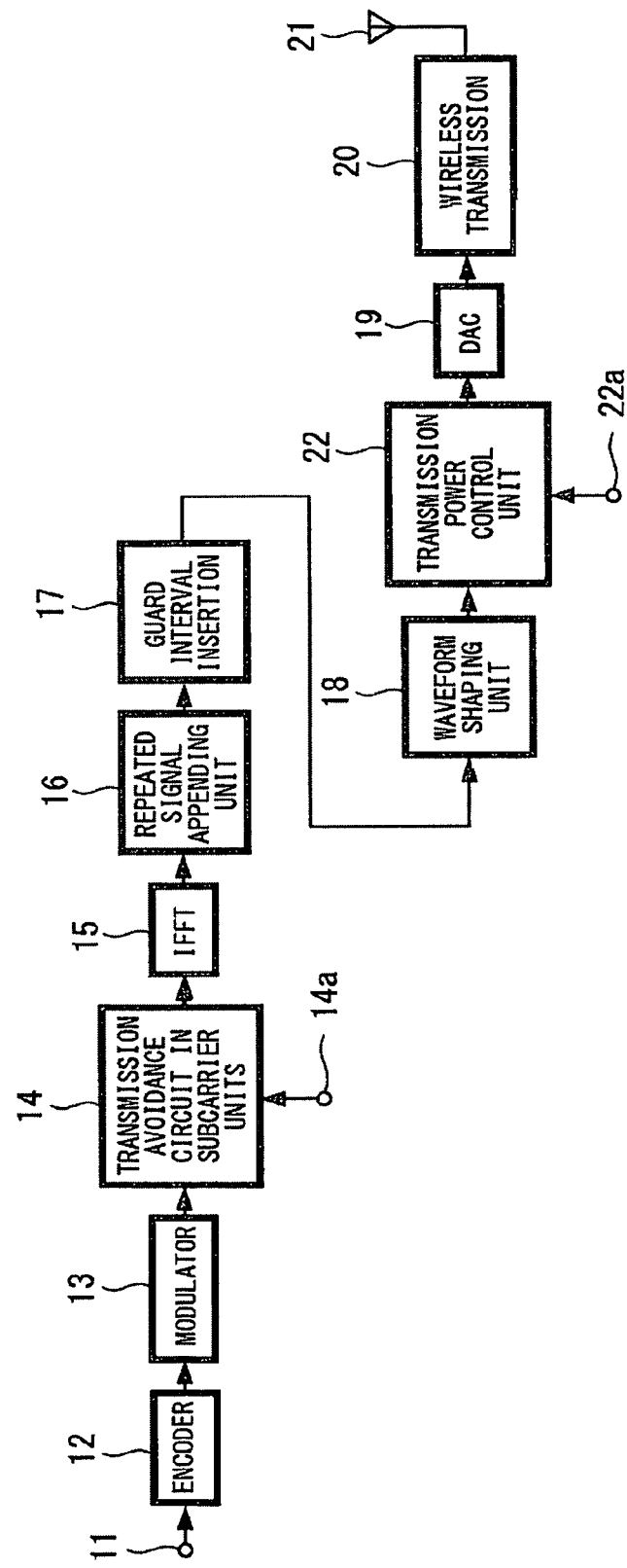
FIG. 12 is a diagram showing an example configuration of a transmission apparatus according to a third embodiment of the present invention.
Figure 13:
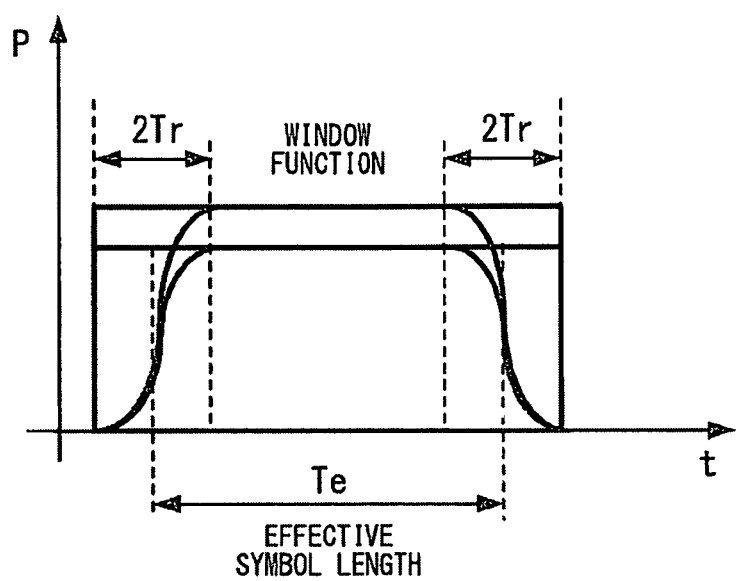
FIG. 13 is a diagram showing an example of waveform shaping using a window function according to the third embodiment of the present invention.

Next, a third embodiment of the present invention will be described with reference to FIGS. 12 to 13. In FIGS. 12 to 13, parts that correspond to those in FIGS. 3 to 11 described above in the first and second embodiments have been assigned the same reference numerals.

The present embodiment also uses a configuration that wirelessly transmits a multicarrier signal where a plurality of subcarriers are disposed at constant frequency intervals. With respect to subcarriers at specific frequency positions in the transmitted frequency band, transmission can be stopped as necessary. Here also, the frequency positions at which transmission is stopped may be decided in advance, or the wireless state in the periphery may be monitored and frequency positions where there is the risk of causing or receiving interference may be set as necessary.

FIG. 12 shows an example configuration of a transmission apparatus according to the present embodiment. As shown in FIG. 12, transmission data obtained at the input terminal 11 is encoded by the encoder 12 and the encoded transmission data is modulated for wireless transmission by the modulator 13. The transmission data (i.e., transmission symbols) modulated by the modulator 13 is supplied to the transmission avoidance circuit 14 in subcarrier units, information on the locations (positions) of subcarriers where transmission is avoided is obtained from a terminal 14a, and data at the subcarrier positions designated by such information is replaced with a null signal. A series of transmission symbols where some of the symbols have been replaced with the null signal is supplied to the IFFT circuit 15 where orthogonal transform processing is carried out to obtain a multicarrier signal.

The transmission symbols after the transform by the IFFT circuit 15 is supplied to the repeated signal appending unit 16 to append repeated signals to the symbols. After this, the transmission symbols appended with the repeated signals are sent to the guard interval inserting unit 17 where guard intervals are inserted at constant intervals. An output into which guard intervals have been inserted is then supplied to the waveform shaping unit 18 where waveform shaping processing is carried out. For example, the waveform shaping processing by the waveform shaping unit 18 is the shaping processing that multiplies by the window function, described with reference to FIG. 5.

Subsequently, the transmission symbols that have been multiplied by the window function using the waveform shaping unit 18 are supplied to the transmission power control unit 22. In the transmission power control unit 22, information on the number of subcarriers where transmission is avoided is obtained from the terminal 22a, and amplification processing that amplifies the transmission power corresponding to the number of subcarriers designated by such information is carried out. For example, the amplification processing for the transmission power may be amplification processing in accordance with the number of subcarriers where transmission has been avoided as described with reference to FIGS. 9 to 11.

The transmission symbol series outputted by the transmission power control unit 22 is supplied to the digital/analog converter 19 and converted to an analog signal. The resulting analog signal is supplied to the wireless transmitter unit 20 and is wirelessly transmitted from the connected antenna 21 on a predetermined transmission frequency.

With the transmission processing configuration shown in FIG. 12, the window function used for multiplying by the waveform shaping unit 18 varies the power as shown in FIG. 13 according to transmission power control. That is, when there is a subcarrier whose transmission has been avoided is present, the signal multiplied by the window function using the waveform shaping unit 18 will be the signal with the low power level shown in FIG. 13. However, by carrying out control by the transmission power control unit 22 to make the power constant, the signal with the high power level shown in FIG. 13 is obtained, which is the same as the case where window, multiplying is carried out with no subcarriers whose transmission is avoided. In FIG. 13, the horizontal axis represents the time t and the vertical axis represents the power P.

As described in the above embodiments, according to the present invention, even when there is a subcarrier whose transmission is avoided, the power of the subcarrier whose transmission is avoided can be greatly lowered compared to the power of the other subcarriers transmitted. For example, it is possible to reduce the level by around 30 dB. In addition, as the transmission processing configuration, since it is sufficient to set the data on the subcarrier where transmission is avoided to a null signal and to append guard intervals, to control the transmission power, and to multiply by the window function either selectively or in combination, a comparatively simplified transmission configuration can be realized.

Note that in the case where there is a subcarrier where transmission is avoided, another power reducing processing for subcarriers where transmission is avoided that is known from the past, such as processing that multiplies the signal with inverse phase of the signals of the subcarriers adjacent to the subcarrier where transmission is avoided, may be combined with the transmission processing according to the present invention.

Next, a fourth embodiment of the present invention will be described with reference to FIGS. 14 to 25. The present embodiment relates to a reception apparatus that receives a multicarrier signal wirelessly transmitted by the transmission apparatus with configuration described above in the first to third embodiments.

Figure 14:
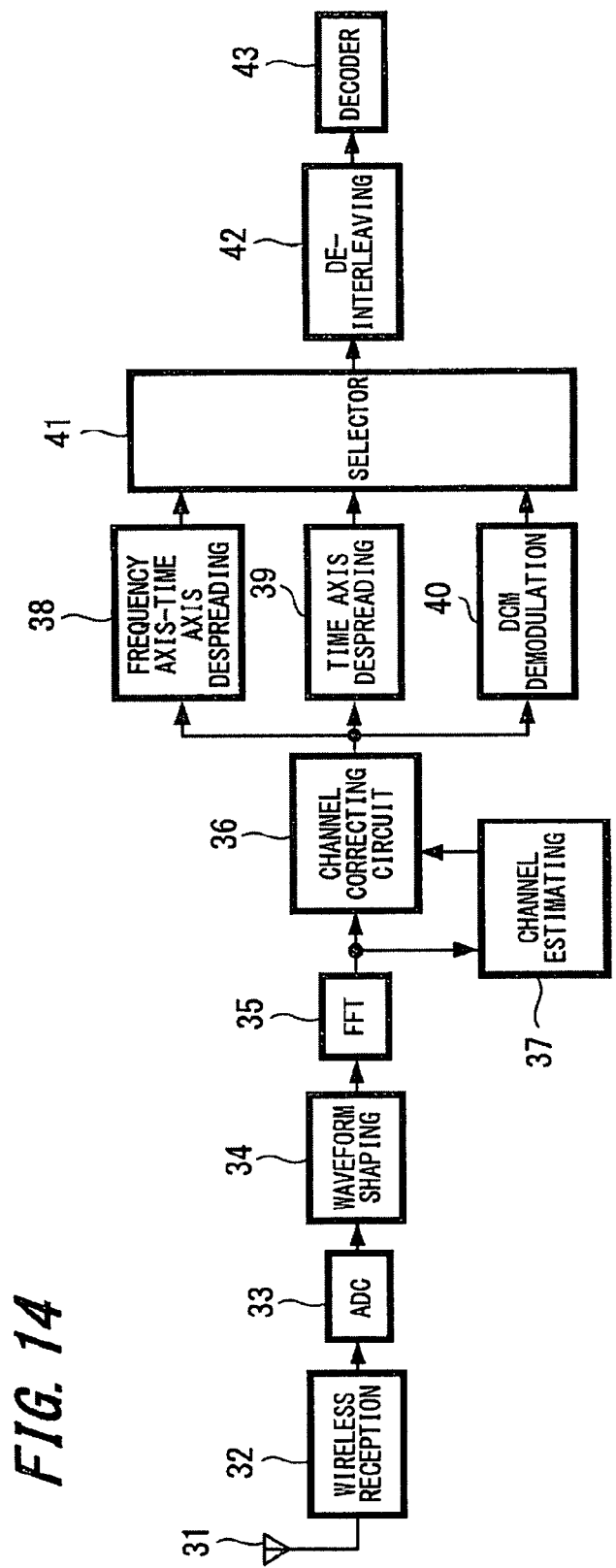
FIG. 14 is a diagram showing an example configuration of a reception apparatus according to a fourth embodiment of the present invention.

FIG. 14 is a diagram showing an example configuration of the reception apparatus according to the present embodiment. As shown in FIG. 14, a wireless reception processing unit 32 connected to an antenna 31 receives a signal on a predetermined transmission frequency band and the reception signal is converted to digital data using an analog/digital converter 33. The converted reception data is supplied to a waveform shaping unit 34 and subjected to waveform shaping. The reception data subjected to waveform shaping is supplied to a fast Fourier transform circuit (FFT circuit) 35 and subjected to an orthogonal transform. As the waveform shaping by the waveform shaping unit 34, when receiving, for example, a signal where a null signal has been used for the guard intervals and the signal has been multiplied by a window function at the transmitter side, processing is carried out that compensates signals where both ends of an effective symbol are attenuated during the transmission processing. More specifically, signal components that protrude from the effective symbol are used to carry out waveform shaping on the signal components at both a front end and a rear end of the effective symbol. The waveform shaping processing will be described later in detail.

After the waveform shaping by the waveform shaping unit 34, the signal transformed by the FFT circuit 35 is subjected to channel correcting processing by a channel correcting circuit 36. As the channel correcting processing, correcting processing corresponding to an estimate of the reception signal state by a channel estimating unit 37 is carried out.

Subsequently, the reception data outputted from the channel correcting circuit 36 is supplied to a frequency axis-time axis despreader circuit 38, a time axis despreader circuit 39, and a demodulation circuit 40. The frequency axis-time axis despreader circuit 38, the time axis despreader circuit 39, and the demodulation circuit 40 are selectively used in accordance with the transmission rate of the reception data. The output of one of the circuits 38, 39, 40 is selected by a selector 41, the selected data is supplied to a de-interleaving unit 42, de-interleaving processing that is reverse processing to the interleaving carried out on the transmitter side is carried out, and the data obtained by the de-interleaving processing is supplied to a decoder 43 and decoded to obtain decoded reception data.

Figure 15:
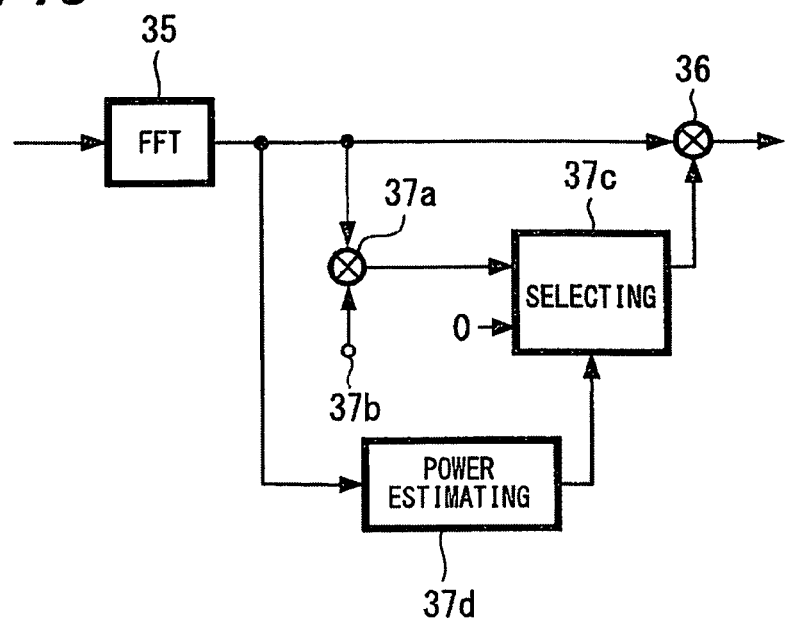
FIG. 15 is a diagram showing an example configuration for channel estimation and correction according to the fourth embodiment of the present invention.

FIG. 15 is a diagram showing an example of the correction configuration of the channel correcting circuit 36 and the estimating configuration of the channel estimating unit 37. The converted output from the FFT circuit 35 is supplied to a multiplier that constitutes the channel correcting circuit 36. Subsequently, the output from the FFT circuit 35 is supplied to an adder 37a, a channel estimation series obtained at the terminal 37b is added thereto, and the added output is supplied to a selecting unit 37c. The transmission power in subcarrier units is estimated by a power estimating unit 37d and based on the estimated result of the power estimating unit 37d, the selecting unit 37c switches between selecting the output from the adder 37a or selecting zero data (null data). Here, the power estimating unit 37d determines whether the transmission power of the subcarrier in question is equal to or below the threshold P, and when it is determined (estimated) that the transmission power is equal to or below the threshold P, the null data is selected by the selecting unit 37c. When the threshold P is exceeded, the output from the adder 37a is selected. The signal selected by the selecting unit 37c is supplied to the multiplier that constitutes the channel correcting circuit 36 and is multiplied by the output of the FFT circuit 35.

With the correction processing configuration shown in FIG. 15, when transmission of a specific subcarrier is avoided during transmission, it is possible to reliably detect this and to avoid using data (i.e., noise) on the subcarrier where transmission is avoided in the reception demodulation processing carried out thereafter.

Figure 16:
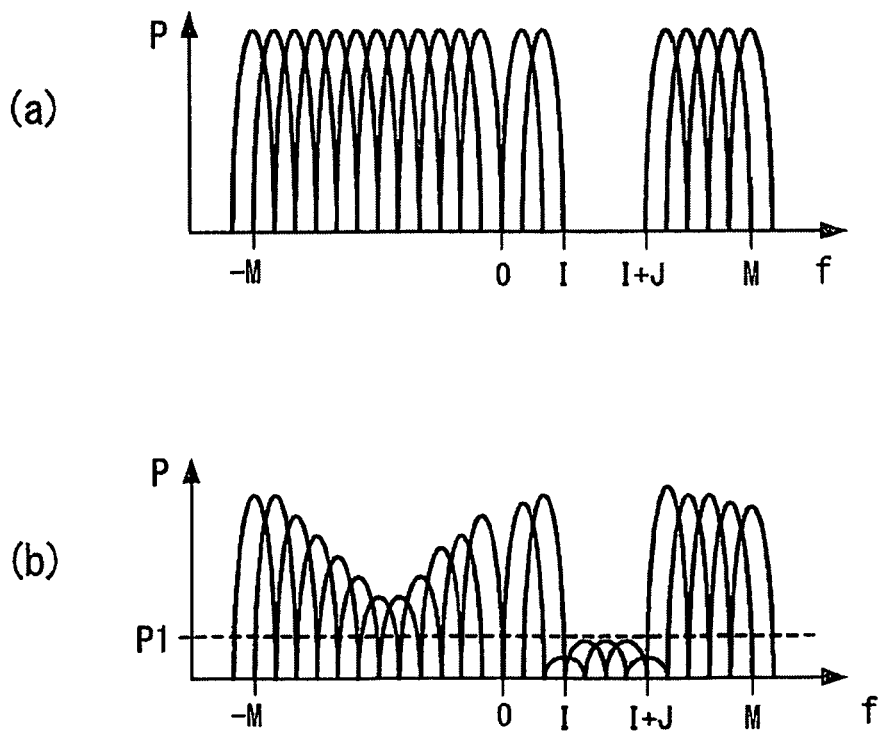
FIG. 16 is a waveform diagram showing an example of reception power according to the fourth: embodiment of the present invention.

That is, as shown in FIG. 16(*a*), in the case where transmission of subcarriers I+J starting from the specific frequency position I was avoided, as shown in FIG. 16(*b*), in the actual reception power received by the reception apparatus, a certain output of reception power may still be received for the subcarriers I+J starting from I. In FIG. 16, the horizontal axis represents the frequency f and the vertical axis represents the power P.

Here, a threshold P1 that can distinguish between the reception power of a subcarrier where transmission was avoided and the reception power of a transmitted subcarrier is set, and with respect to data on a subcarrier with a reception power that is no greater than the threshold P1, null data is selected by the selecting unit 37*c* and the null data is outputted by the channel correcting circuit 36.

Figure 17:
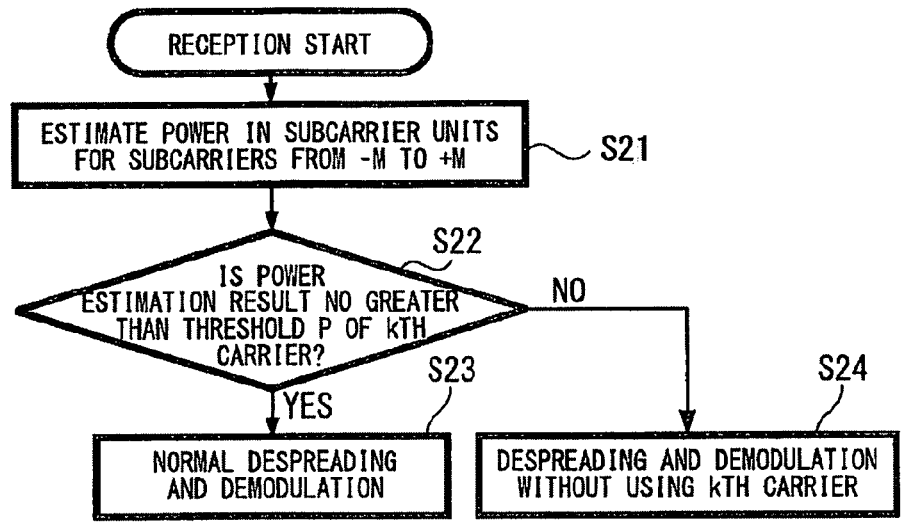
FIG. 17 is a flowchart showing example processing during power estimation according to the fourth embodiment of the present invention.

FIG. 17 is a flowchart showing example processing based on the estimation processing by the channel, estimating unit 37. First, when subcarriers from −M to +M are received, the reception power is estimated in subcarrier units (step S21). Subsequently, for the respective subcarriers, it is determined whether there is a subcarrier where the power estimation result is no greater than the threshold P (step S22), and when there are no subcarriers where the power is no greater than the threshold P, normal despreading processing and demodulation processing are carried out (step S23). However, when the result is no greater than the threshold P for the kth subcarrier, for example, despreading and demodulation are carried out without using the kth subcarrier (step S24).

Figure 18:
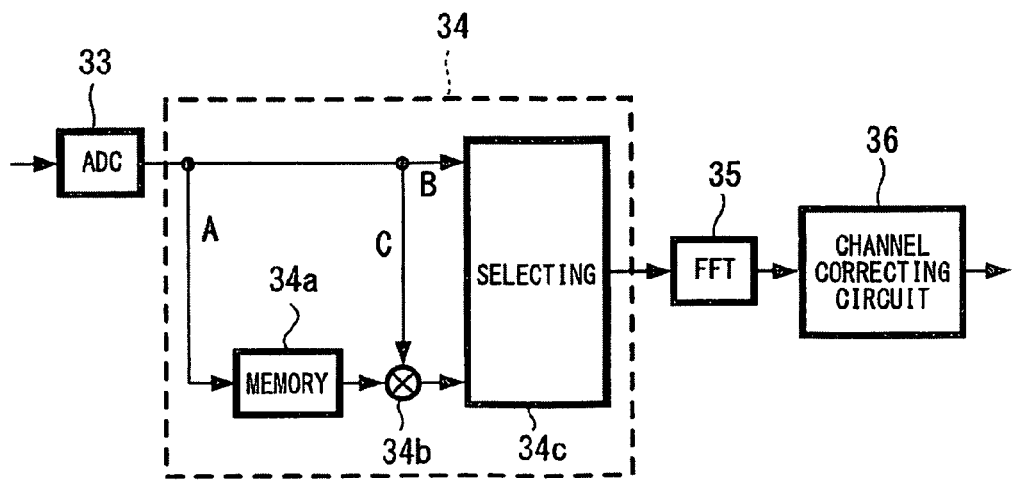
FIG. 18 is a diagram showing an example configuration of a waveform shaping circuit according to the fourth embodiment of the present invention.

Next, an example of the detailed circuit configuration of the waveform shaping unit 34 is shown in FIG. 18. The waveform shaping unit 34 according to the present embodiment is configured to carry out cyclic addition. That is, the output of the analog/digital converter 33 is supplied to and stored in a memory 34*a*, and the stored signal and a non-stored signal are added by an adder 34*b*. After this, the added signal and the direct output from the analog/digital converter 33 are selected by a selecting unit 34*c* and supplied to the FFT circuit 35.

Figure 19:
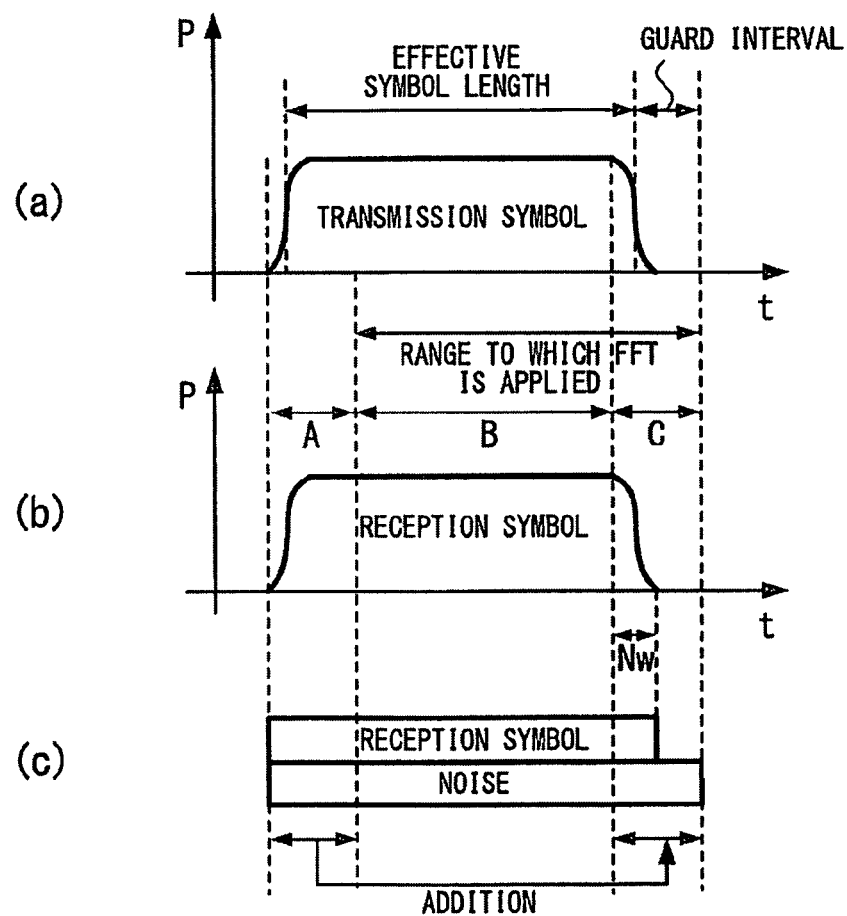
FIG. 19 is a characteristics graph showing an example of waveform shaping processing according to the fourth embodiment of the present invention.

Here, FIG. 19 shows an example of the waveform shaping processing by the circuit shown in FIG. 18. In FIG. 19, the horizontal axis represents the time t and the vertical axis represents the power P. When the transmission symbols that have been multiplied by the window function and transmitted are completely free of reflected waves, the signal shown in FIG. 19(*a*) is received. When a guard interval is appended, a section corresponding to the guard interval will also be present. As shown in FIGS. 19(*b*) and 19(*c*), such signal is received with the range Nw shown in FIG. 19(*b*) protruding from the effective symbol length. Therefore, the signal of a section A shown in FIG. 19(*b*) is stored in the memory 34*a*, the signal of a section B is supplied to the selecting unit 34*c*, and the signal of a section C is added to the signal of the section A stored in the memory 34*a*. The signal of the section B is supplied as it is to the FFT circuit 35 and the signal obtained by adding the signal of the section C and the signal of the section A is also supplied to the FFT circuit 35, where an FFT is applied to the range of the signal of the section B and the added signal for the sections A and C.

Figure 20:
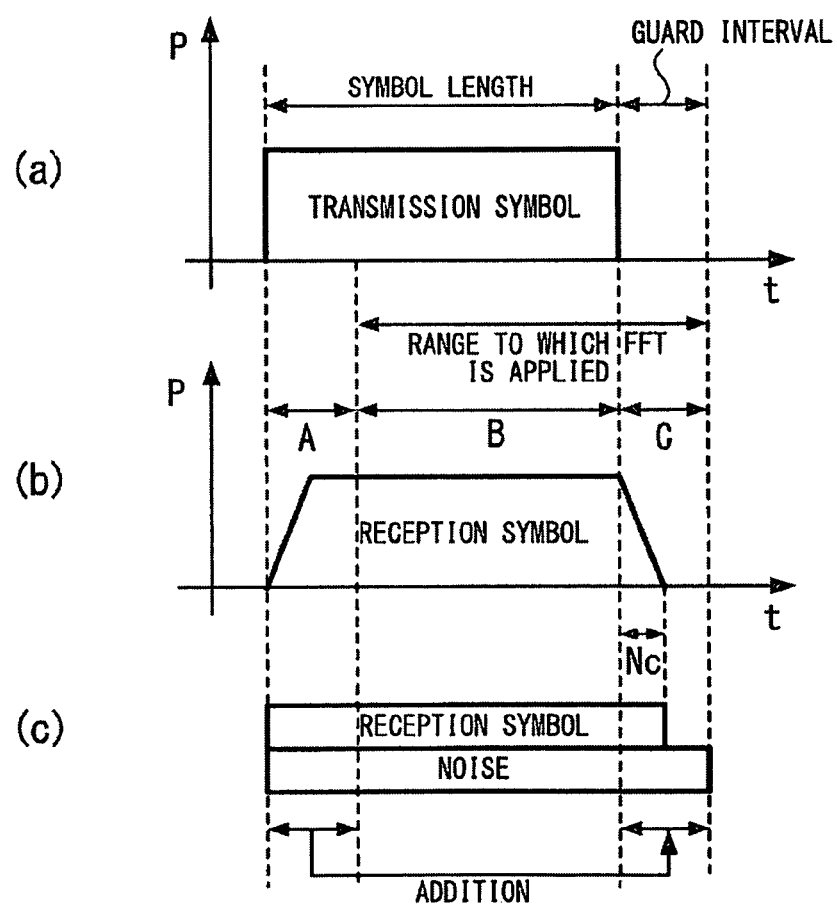
FIG. 20 is a characteristics graph showing an example of waveform shaping processing according to the fourth embodiment of the present invention.

Here, for reference purposes, the waveform shaping processing for a multipath signal is shown in FIGS. 20(*a*), (*b*), and 20(*c*). In FIG. 20, the horizontal axis represents the time t and the vertical axis represents the power P. When processing a multipath signal, the range Nc protrudes from the effective symbol length due to the effect of the multipath. In the same way as in the example in FIG. 19, the signal of a section A is stored in the memory, the signal of a section B is passed as it is to the FFT circuit, and the signal of a section C is added to the stored signal of the section A and the added result is passed to the FFT circuit. In this case also, the range of the signal of the section B and the signal of the section C is subjected to the transform processing by the FFT circuit.

Next, an example of processing that changes the range for the cyclic addition will be described with reference to FIGS. 21 to 25. As described earlier, when window multiplication has been carried out, the signal will protrude from the effective symbol length even when the signal is not a multipath signal. In reality though, since protrusion may also be caused by a multipath, the signal will protrude by a range (Nw+Nc) obtained by adding the influence Nw (see FIG. 19) of the window multiplication and the influence Nc (see FIG. 20) of the multipath. That is, a configuration that can change the range to be added based on whether window multiplication processing has been carried out on the transmission symbols can be conceived.

Figure 21:
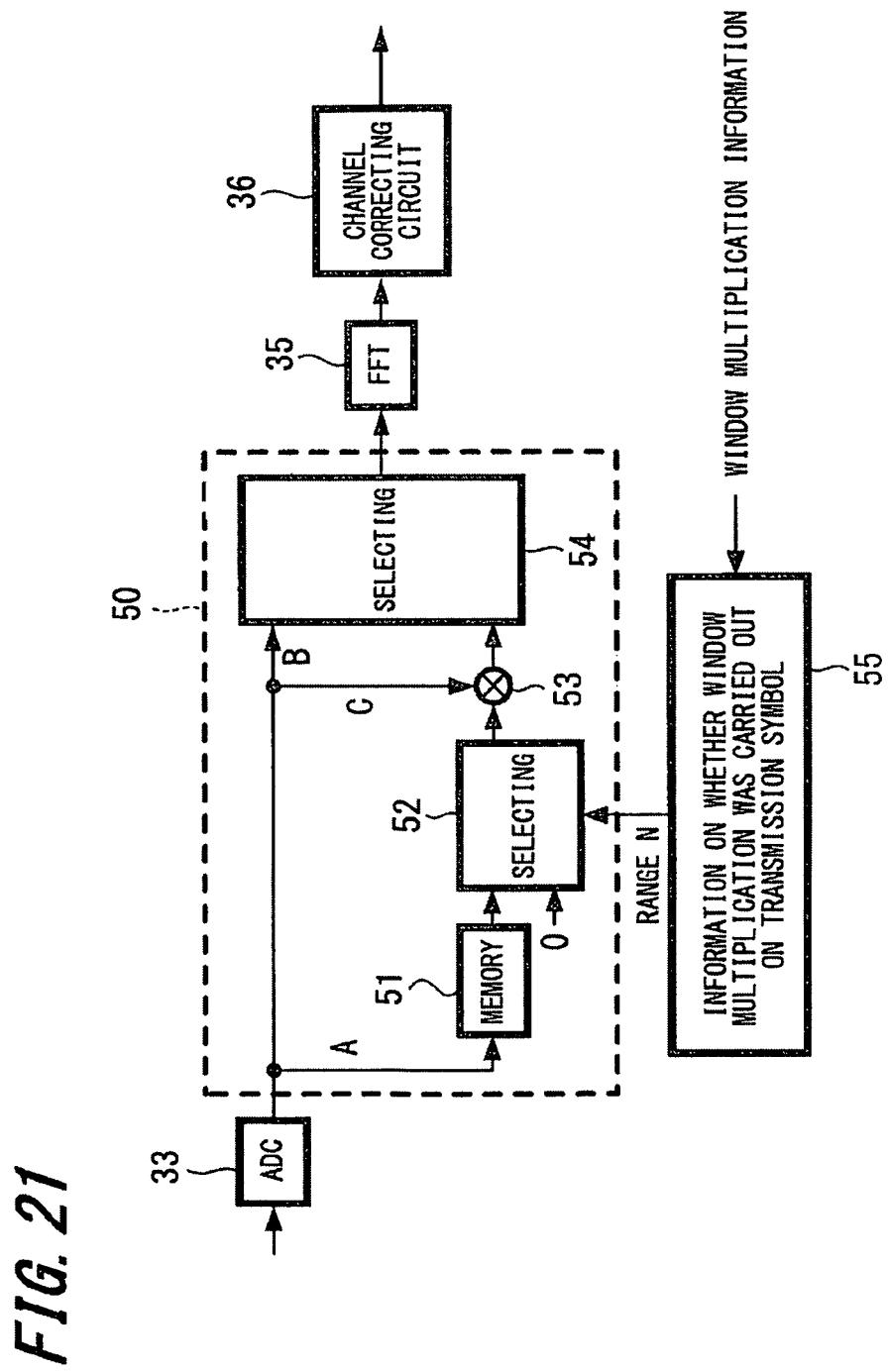
FIG. 21 is a diagram showing an example configuration of a circuit that changes added range according to the fourth embodiment of the present invention.

FIG. 21 shows one example of such configuration. FIG. 21 shows a cyclic adding circuit 50, to which the output of the analog/digital converter 33 is supplied, and the output from the cyclic adding circuit 50 is supplied to the FFT circuit 35. In the cyclic adding circuit 50, input data is supplied to and stored in a memory 51, and the output from the memory 51 is supplied to an adder 53 via a selecting unit 52 and is added to the input data. The selecting unit 52 selects either the output of the memory 51 or null data. One of the input data and the output of the adder 53 is selected by a selecting unit 54 and the selection output is supplied to the FFT circuit 35. As the range N where the output of the memory 51 is selected by the selecting unit 52, information on whether window multiplication was carried out on the received transmission symbols is determined by a determining unit 55, and the selection is made according to whether window multiplication was carried out.

Figure 23:
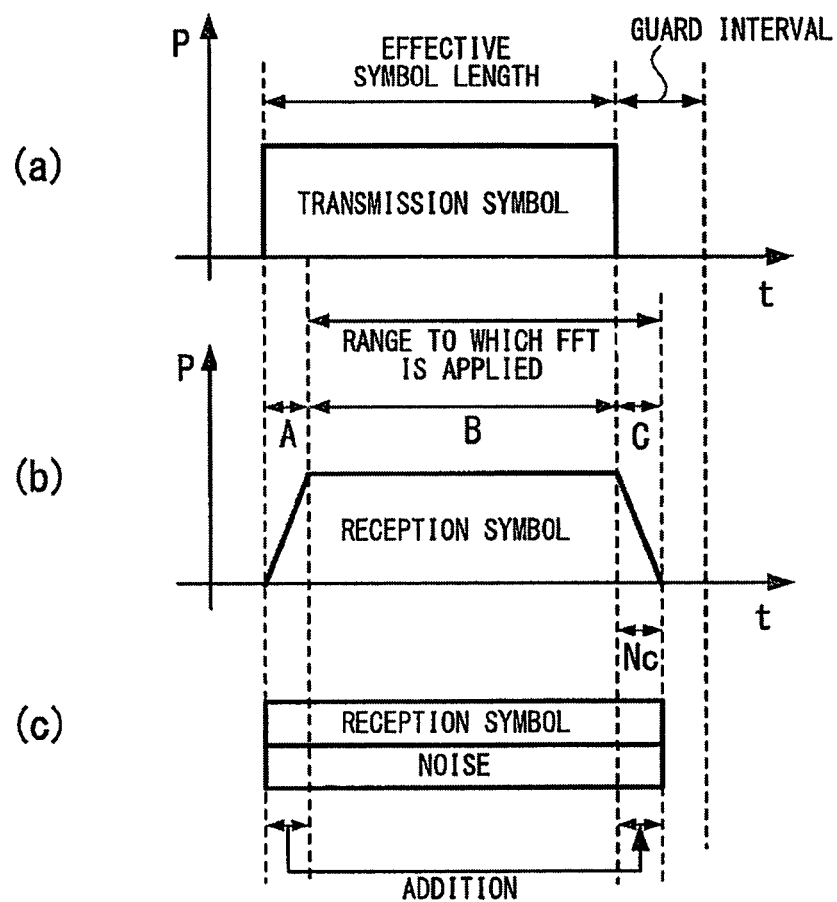
FIG. 23 is a characteristics graph showing an example of waveform shaping processing according to the fourth embodiment of the present invention.

The processing by the circuits shown in FIG. 21 will be described with reference to FIG. 23. In FIG. 23, the horizontal axis represents the time t and the vertical axis represents the power P.

Figure 24:
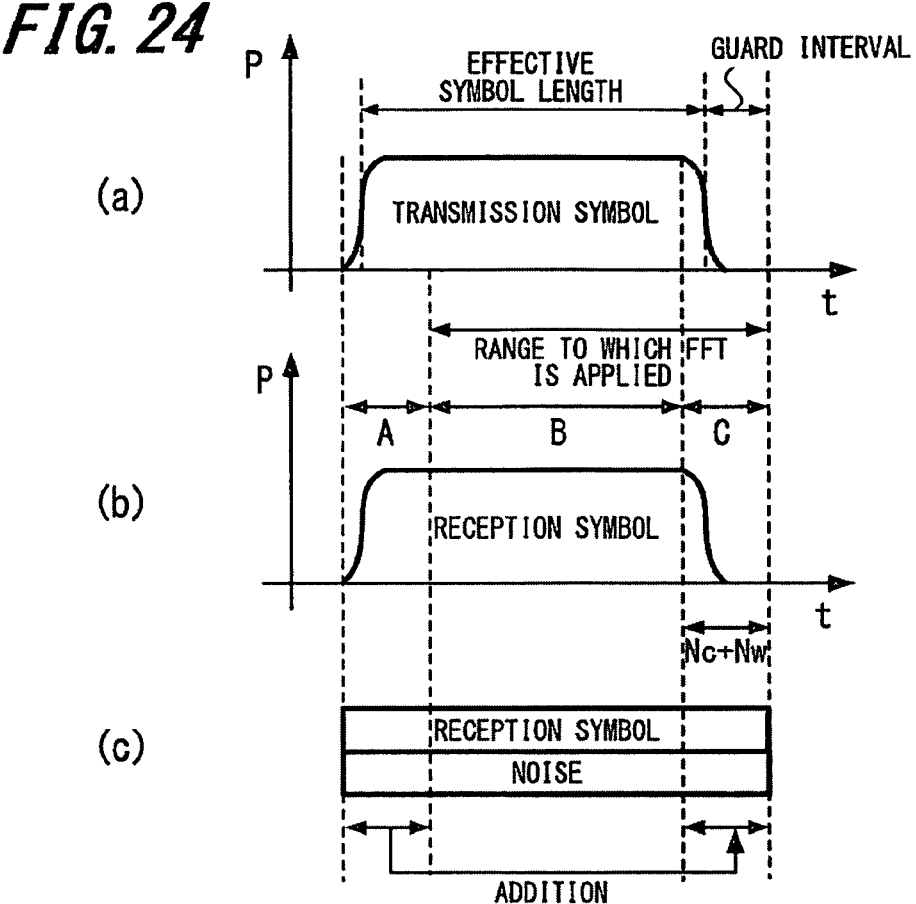
FIG. 24 is a characteristics graph showing an example of waveform shaping processing according to the fourth embodiment of the present invention.

For example, a case will be described where a fixed range A is added to a fixed range C without the entire range of the guard intervals being added. As shown in FIG. 23, when normal transmission symbols have been transmitted from the transmitter side, the protruding range of the transmission symbols is Nc, and the symbols can be received without distortion. However, as shown in FIG. 24, when window multiplication was carried out on the transmission symbols, the protruding range of the signal will be (Nw+Nc) and the protruding range is increased. Accordingly, it is necessary to increase the added range by Nw. In FIG. 24, the horizontal axis represents time t and the vertical axis represents power P. In this way, by changing the range to be added using the selecting unit 52, it is possible to carry out suitable reception processing.

Figure 25:
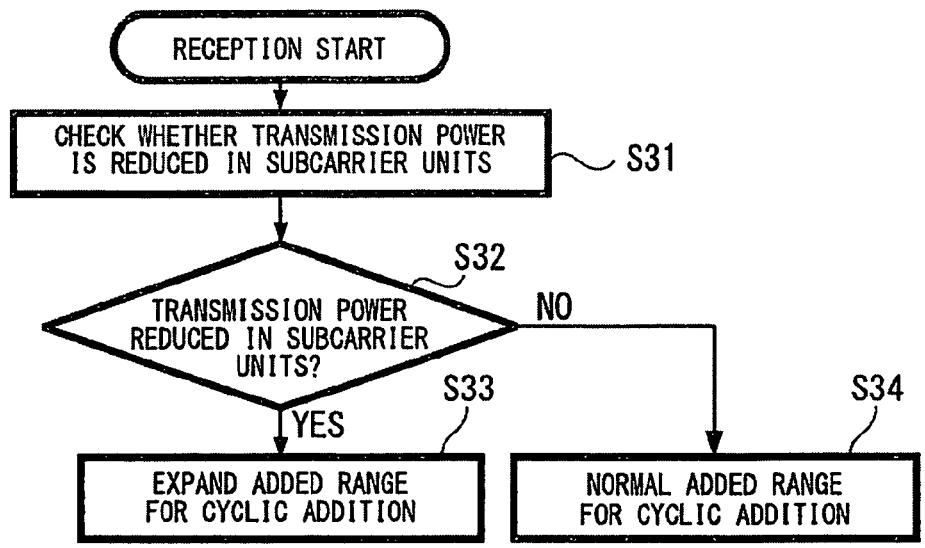
FIG. 25 is a flowchart showing an example of processing based on determination according to the fourth embodiment of the present invention.

The flowchart in FIG. 25 shows an example of processing where the range subjected to the cyclic addition increases or decreases depending on whether window multiplication is carried out. It is checked in subcarrier units whether the transmission power has been reduced (step S31) and it is then determined in subcarrier units whether the transmission power has been reduced (step S32). When it is determined that transmission power has been reduced in subcarrier units, the range added by the cyclic addition is extended (step S33). When transmission power has not been reduced in subcarrier units, the range for the cyclic addition is set at the normal added range (step S34). Note that it is assumed that in this example, information on whether window multiplication has been carried out is sent and arrived from the transmitter side or is known in advance by the receiver side.

Figure 22:
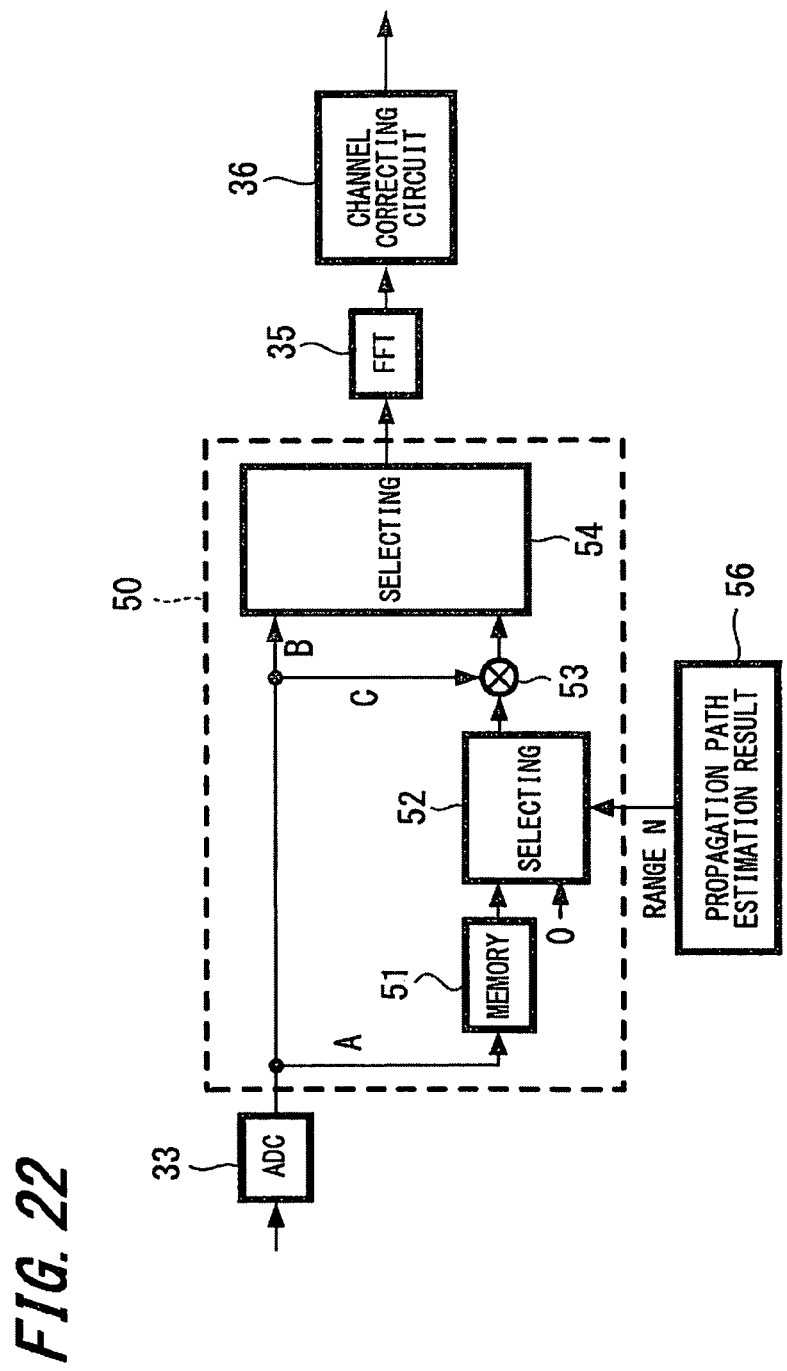
FIG. 22 is a diagram showing an example configuration of a circuit that changes added range according to the fourth embodiment of the present invention.

Note that in the example in FIG. 21, although the added range is changed based on a determination result by the determining unit 55 on information showing whether window multiplication was carried out, as shown in FIG. 22 for example, it is also possible to use a configuration including a propagation path estimation result determining unit 56 and to appropriately change the added range using a channel estimation result of such determining unit. Here, since the range (Nw+Nc) is estimated when the estimation result shows that window multiplication was carried out, it would be possible to cope with a protruding range caused by window multiplication by using such configuration as it is. In this example, the added range may be the entire guard intervals. However, if the entire guard intervals are set as the added ranges, an area where there are no reception symbols and only noise is added may be present. Therefore, it is necessary to change the added range based on whether window multiplication has been carried out.

EXPLANATION OF REFERENCE NUMERALS

1—input terminal, 2—encoder, 3—modulator, 4—Inverse Fast Fourier Transform circuit (IFFT circuit), 5—guard interval inserting unit, 6—digital/analog converter, 7—wireless transmission unit, 8—antenna, 9—transmission avoidance circuit in subcarrier units, 9a—terminal, 11—transmission data, 12—encoder, 13—modulator, 14—transmission avoidance circuit in subcarrier units, 14a—terminal, 15—Inverse Fast Fourier Transform circuit (IFFT circuit), 16—repeated signal appending unit, 17—guard interval inserting unit, 18—waveform shaping unit, 19—digital/analog converter, 20—wireless transmission processing unit, 21—antenna, 22—transmission power control unit, 22a—terminal, 31—antenna, 32—wireless reception processing unit, 33—analog/digital converter, 34—waveform shaping unit, 35—Fast Fourier Transform circuit (FFT circuit), 36—channel correcting circuit, 37—channel estimating unit, 37a—adder, 37b—terminal, 37c—selecting unit, 37d—power estimating unit, 38—frequency axis-time axis despreader circuit, 39—time axis despreader circuit, 40—demodulation circuit, 41—selector, 42—de-interleaving unit, 43—decoder, 50—cyclic adding circuit, 51—memory, 52—selecting unit, 53—adder, 54—selecting unit, 55—determining unit

The invention claimed is:

1. A transmission apparatus that transmits a multicarrier signal where a plurality of subcarriers are disposed at predetermined frequency intervals, characterized by comprising:
a transmission avoidance processing unit that replaces signals corresponding to subcarriers, in the plurality of subcarriers, at frequency positions where transmission is avoided with a null signal;
a transform unit that carries out processing including an inverse Fourier transform on an output signal of the transmission avoidance processing unit to convert the output to the multicarrier signal;
a transmission power setting unit that amplifies a transmission power of the multicarrier signal outputted from the transform unit in accordance with the subcarriers replaced with the null signal by the transmission avoidance processing unit;
a repeated signal appending unit that disposes part of an effective symbol of the output signal subjected to the inverse Fourier transform by the transform unit as a repeated signal before and/or after the effective symbol;
a multiplying unit that multiplies an output of the repeated signal appending unit by a predetermined window function;
a waveform shaping unit that adds an effective symbol of an end part whose energy has attenuated due to multiplication by the window function to an opposite end part of an output of the multiplying unit, characterized in that an output of the waveform shaping unit is supplied to the transmission power setting unit; and
a transmission unit that transmits the amplified signal.

2. A transmission method that transmits a multicarrier signal where a plurality of subcarriers are disposed at predetermined frequency intervals, characterized by:
carrying out transmission avoidance processing that replaces signals corresponding to subcarriers, in the plurality of subcarriers, at frequency positions where transmission is avoided with a null signal;
carrying out an inverse Fourier transform on an output signal of the transmission avoidance processing to obtain the multicarrier signal with the frequency intervals;
amplifying a transmission power of the converted multicarrier signal in accordance with the subcarriers replaced with the null signal by the transmission avoidance processing;
carrying out signal appending processing that disposes part of an effective symbol of the output signal subjected to the inverse Fourier transform as a repeated signal before and/or after the effective symbol;
carrying out multiplication processing that multiplies an output of the signal appending processing by a predetermined window function;
carrying out waveform shaping processing that adds an effective symbol of an end part whose energy has attenuated due to multiplication by the window function to an opposite end part of an output of the multiplication processing; and
transmitting the amplified signal.

3. A transmission system that transmits a multicarrier signal where a plurality of subcarriers are disposed at predetermined frequency intervals, characterized by comprising:
a transmission apparatus including
a transmission avoidance processing unit that replaces signals corresponding to subcarriers, in the plurality of subcarriers, at frequency positions where transmission is avoided with a null signal;
a transform unit that carries out an inverse fast Fourier transform on an output signal of the transmission avoidance processing unit to convert the output to the multicarrier signal with the frequency intervals;
a transmission power setting unit that sets a transmission power of the multicarrier signal outputted from the transform unit and amplifies the transmission power in accordance with the subcarriers replaced with the null signal by the transmission avoidance processing unit;
a repeated signal appending unit that disposes part of an effective symbol of the output signal subjected to the inverse fast Fourier transform by the transform unit as a repeated signal before and/or after the effective symbol;

a multiplying unit that multiplies an output of the repeated signal appending unit by a predetermined window function;

a waveform shaping unit that adds an effective symbol of an end part whose energy has attenuated due to multiplication by the window function to an opposite end part of an output of the multiplying unit, characterized in that an output of the waveform shaping unit is supplied to the transmission power setting unit; and a transmission unit that transmits the multicarrier signal whose transmission power has been set by the transmission power setting unit, and a reception apparatus including a transform unit that carries out a fast Fourier transform on a reception multicarrier signal;

an estimating unit that estimates subcarriers where transmission was avoided in the reception multicarrier signal transformed by the transform unit; and a demodulation processing unit operable when the estimating unit has estimated that subcarriers where transmission was avoided are present, to carry out dispreading and demodulation without using the subcarriers where transmission was avoided.

\* \* \* \* \*